United States Patent [19]
Viel

[11] Patent Number: 4,748,796
[45] Date of Patent: Jun. 7, 1988

[54] METHOD FOR CONDITIONING IN A WELL PLATE IN A PERMANENT ADHESIVE COMPOSITION

[75] Inventor: Gerard H. Viel, Crepy en Valois, France

[73] Assignee: Societe Nouvelle Raffinerie Meridionale de Ceresines - Belix, Drancy, France

[21] Appl. No.: 877,182

[22] Filed: Jun. 20, 1986

Related U.S. Application Data

[63] Continuation of Ser. No. 678,559, filed as PCT FR84/00044, Feb. 29, 1984, published as WO84/03457, Sept. 13, 1984.

[30] Foreign Application Priority Data

Mar. 1, 1983 [FR] France .................. 83 03386

[51] Int. Cl.$^4$ .................................. B65B 61/24
[52] U.S. Cl. ................... 53/411; 53/440; 53/472; 156/245; 156/289; 156/292; 264/24; 264/255; 264/264; 264/268; 427/28; 427/133; 427/203

[58] Field of Search ............... 264/24, 255, 264, 265, 264/267, 268, 130, 131, 22, 297.1, 297.6, 297.8; 427/27, 28, 33, 26, 202, 203, 133, 208.8; 53/401, 428, 411, 440, 472; 156/289, 245, 292, 297, 227

[56] References Cited

U.S. PATENT DOCUMENTS 3,165,567 1/1965 Olson ............................. 264/255
3,278,656 10/1966 Dicks et al. ......................... 264/24
3,528,841 12/1970 Donaldson et al. .

*Primary Examiner*—Jan H. Silbaugh
*Assistant Examiner*—Mary Lynn Fertig
*Attorney, Agent, or Firm*—Mason, Fenwick & Lawrence

[57] ABSTRACT

An open-topped casting mold and a mating cover are electrostatically coated with a powder screen and casting material is poured into the mold without disturbing the powder by holding the powder in position with static electricity. The casting material is permitted to harden and a screen of powdery or fatty material placed on the upper surface of the hardened material and protective film applied over the screen.

20 Claims, 1 Drawing Sheet

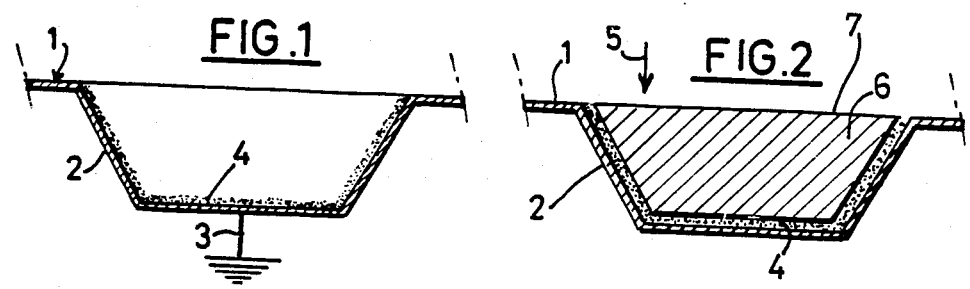
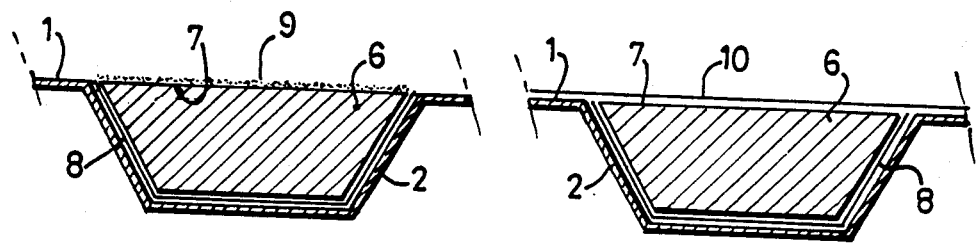
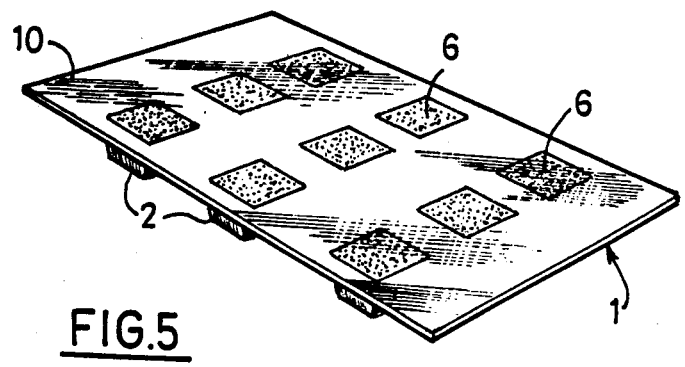

METHOD FOR CONDITIONING IN A WELL PLATE IN A PERMANENT ADHESIVE COMPOSITION

This application is a continuation of application Ser. No. 678,559, filed as PCT FR84/00044, Feb. 29, 1984, published as WO84/03457, Sep. 13, 1984, now abandoned.

DESCRIPTION

Method for packaging a permanent adhesive composition in a plate provided with cavities, device therefor and package obtained by implementing this method.

The present invention relates to a method for packaging permanent adhesive material and, more particularly, to a method for packaging masses which can be melted by heat and which physically have varying shapes and are in a liquid, plastic, elastic, pasty, semi-solid or solid state, depending on their nature and their constituents.

The present invention also relates to a device for implementing the said method, as well as to the various packaged articles resulting from this implementation.

During the course of numerous chemical and industrial activities, it is known, common and necessary to have to use permanent adhesive compositions, i.e. masses which, when cold, and more particularly at the normal handling temperature, which is known to be close to 20° C., satisfy one or more of the following conditions:
  intrinsic adhesiveness of the mass,
  surface adhesion or "tack" in normal temperature and pressure conditions,
  sensitivity to pressure,
  occurrence of a change in surface state (adhesiveness) due to a natural rise in temperature (summer period for example).

The general term "permanent adhesive compositions" thus includes the following:
  (a) adhesive resins (colophane, coumarone-indene, aliphatic resins)
  (b) certain grades of polymers (polypropylenes, polyisobutylenes) and co-polymers,
  (c) certain pitches and bitumens capable of, i.e. suitable for, deformation,
  (d) pitches and bitumens modified with resins, plasticizers and elastomers,
  (e) certain elastomers,
  (f) various formulations of adhesive hot-melts, comprising at least one polymer, at least one natural or synthetic resin, one plasticizer and if necessary a filler, and,
  (g) generally all products in their natural state and processed products containing, if appropriate, a filler, which develop adhesiveness when cold, in accordance with the conditions defined above.

On account of the inherent nature of their adhesive properties when cold, it is obvious that the various compositions listed above must be protected both during handling and during transport or storage, so as to prevent them massing together or prevent impurities becoming attached to them.

To this end, numerous techniques have been proposed and have been implemented in order to package the permanent adhesive compositions and thus prevent them massing together and prevent impurities becoming attached to them.

Thus, it is known to package these types of compositions in containers of varying volumes and shapes, such as plates in which cavities have been made, these cavities being able to contain in the region of 100 to 1000 grams of the adhesive mass. Such plates are made of a special plastic material, such that the walls of the cavities have non-stick properties. In these conditions, these plates are used to package the processed composition in each cavity both during storage and during transport, the said compositions simply being removed from the molds when they are required to be used.

This protective method, however, has two major drawbacks;
  (a) the high cost of the containers, which is due mainly to the non-stick lining,
  (b) the need for the user himself to remove the objects from the molds, an operation which is often quite difficult in particular when the permanent adhesive compositions contained in the cavities contract a little or not at all during their change of state.

The object of the present invention is to overcome these drawbacks; to this end, it proposes a processing and packaging method and device, by means of which it is possible to protect permanent adhesive compositions inside low-cost plates provided with cavities and, moreover, ensure easy removal from the molds, without loss of packaged material, the said invention consisting, in fact, in that all the mass contained in a cavity is totally isolated from the walls of the said cavity.

The first subject of the present invention, therefore, is a method for packaging a permanent adhesive composition in a plate provided with one or more cavities, the said method comprising the known stages of (a) casting the said composition in each cavity of the plate, (b) cooling the cast mass and, if necessary. (c) protecting this liquid, pasty or solid mass contained in its cavity, so as to prevent impurities becoming attached to this mass during storage and/or handling, wherein, before casting, a screen of powdery material is provided over the entire inner surface of each cavity and wherein the said screen is kept coherent during the entire casting operation so that there is permanent mutual bonding of the grains of the powdery material.

After casting and cooling the cast mass of adhesive composition in its cavity, the force of attraction of the grains of the powdery material with respect to the walls of the cavity is lessened and even becomes non-existent, whereas the adhesiveness of the cast composition increases. Thus, the screen of powdery material gradually detaches itself from the inner surface of the cavity and adheres to the surface of the cast mass, thereby protecting it.

As a result of implementation of this method, it is obvious that each packaged mass, contained in a cavity, is perfectly protected and isolated from the walls of the said cavity by the screen of powdery material, the thickness of which is uniform and fine and in any case proportioned very precisely. In these conditions, the quantity of powdery material required to isolate the cast mass relative to the walls of the cavity is small and represents a percentage, in relation to the coated composition, which the user is fully aware of.

Thus, in the case where the powdery material is chemically inert, it will be unable to create problems when the permanent adhesive composition is applied since only a minute quantity of the said powdery material partly envelops the latter.

Conversely, if the powdery coating material is chosen as having to be part of the formulation for which the permanent adhesive composition is intended, it will preferably be applied beforehand in the form of a protective screen in a quantity such that it will no longer be necessary to add any in order to complete the formulation or else it will be applied in an insufficient but perfectly defined quantity so that it can be brought up to the ideal percentage when all the other constituents belonging to the said formulation are subsequently added.

In a preferred method of implementation, the screen is provided before casting and kept coherent for the entire duration of the casting operation by electrostatic means. As a result of this method, it is apparently possible to form a powdery, uniform, homogeneous and continuous screen, whatever the shape (hollow or raised) of the inner surface of the mold, thereby ensuring the provision of a protective screen, the thickness of which is precisely related to the mass of the permanent adhesive composition to be packaged. Moreover, as a result of this method, it is possible to cast any permanent adhesive composition which can be melted by heat without displacing or deforming the screen of powdery material, since the latter is "fixed electrically".

In another variation of implementation, the screen is obtained by superimposing several layers of grains of powdery material. Thus, at the place of use, after removal from the molds, it will be possible to recover the outermost layers of grains, if required, either because an excessive quantity of powdery material will have been used to protect the packaged mass, or because it will be economically advantageous to recover part of the powdery isolating mass since it has a high price per unit volume.

In a variation of implementation, in which, after cooling and if necessary after hardening and shaping of the mass of a permanent adhesive composition cast in the cavity, the said mass is protected to prevent impurities becoming attached to it, a film of flexible material, paper or thermoplastic material, for example silicone-coated material, or a coating of fatty liquid material, or an as uniform as possible sprinkling of grains of a powdery material, which is identical to or different from that provided in the form of a screen on the inner surface of each cavity, is applied to the bare horizontal upper surface of the packaged mass.

Protection of the cast mass of a permanent adhesive composition can also be ensured more conventionally by covering each cavity of the plate separately, or the plate itself in its entirety, with a lid in the form of a cloche.

A second subject of the present invention is a device for implementing the method claimed above, the said device comprising at least one plate provided with one or more cavities, each receiving a casting of the permanent adhesive composition, and also comprising means for forming a screen of powdery material over the entire inner surface of each cavity and means for keeping this screen coherent during the entire casting operation.

In a preferred embodiment, the device also comprises means for grounding the mold, as well as means for providing each grain of the powdery material with a positive electrical charge. To this end, the inner surface of each cavity is advantageously metallic or lined with a layer suitable for receiving an electrostatic charge.

A third subject of the present invention is a package for a permanent adhesive composition, obtained by implementing the method as claimed above, which takes the form of a plate, each cavity of which is filled with a liquid, pasty or solid mass of the cast composition, the said mass being isolated from the cavity by at least one screen of powdery material which covers the entire inner surface of the said cavity.

In a variation of embodiment in which the mass contained in each cavity is protected, the bare horizontal upper surface of the packaged mass is covered with a film of flexible material, or a coating of fatty liquid material, or a sprinkling of grains of powdery material. In this latter variation, the powdery material is, as chosen by the user, identical to or different from that provided as a screen over the inner surface of each cavity.

So that the subject of the present invention can be better understood, a description is given below, by way of a purely illustrative and non-limiting example, of an embodiment, with reference to the attached drawings in which:

FIG. 1 is a cross-sectional view of part of a plate provided with cavities, at the moment when the cavity shown is subjected to the operation involving the formation of the protective screen over its entire inner surface, FIG. 2 is a cross-sectional view of the cavity of FIG. 1 at the moment when the adhesive composition is cast, FIG. 3 is a cross-sectional view of the cavity of FIG. 1, filled with the packaged mass of an adhesive composition the upper surface of which is protected by powdering, FIG. 4 is a view identical to that of FIG. 3, in which the upper surface of the packaged mass is protected by a film of flexible material, and FIG. 5 is a perspective view of a plate provided with six cavities, each of which is filled with the packaged mass, the said cavities being protected by means of a single sheet of film which covers the entire upper surface of the plate.

With reference to the drawing, it can be seen that a plate provided with cavities 2 is designated in its entirety by 1. The inner face of each cavity is metallic or lined with a layer suitable for receiving an electrostatic charge. Furthermore, the walls of each cavity are grounded, as is indicated by 3, preferably moreover by means of a single electrical connection made between the plate 1 and the ground.

The inner surface of each cavity 2 being perfectly clean, electrostatic powdering 4 of all its walls is performed using any known method from a similar technique, for example that used for coating electrical cables or for painting radiators, bicycles and generally all objects with a complicated shape.

Electrostatic powdering of the inside of each cavity is performed, for example, by means of spraying with a gun, the grains of powder being transported by air as far as the spray head which itself is equipped with a gun inside which each grain is positively charged using a high potential of the order of 20,000 to 80,000 volts, for example, and a very low current of the order of 2.5 micro amperes.

As a variation, electrostatic powdering can be obtained by passing the plate 1 through a fluidization bed.

It is obvious that, using either of these methods, it is possible to form a powdery, homogeneous and continuous screen which is relatively fine in thickness and in any case uniform whatever the shape (hollow, raised or recessed) of each cavity 2 to be filled. Moreover, using this method of forming a powdery screen by electrostatic means, it is possible to determine a screen with a thickness of the order of 10 to 80$\mu$, i.e. directly related to the masses to be packaged.

After the operation of electrostatic powdering, there follows the operation of casting the permanent adhesive composition in each cavity of the plate, the inner surface of which has been protected beforehand in this way. Casting of the composition, indicated by the arrow 5, is determined volumetrically so that, in each cavity 2, the cast composition 6 is substantially level with the top of the said cavity and forms there a horizontal surface plane 7.

For the entire duration of the casting operation, the powdery screen 4 remains perfectly coherent, showing no signs of dissociation since it was fixed electrically, so much so that the permanent adhesive composition never comes into contact with the inner surface of the cavity and therefore is in no danger of adhering to it.

The grains of powdery material constitute, as it were, a screen with one layer or several superimposed layers which are completely impermeable to the cast composition. This screen is thus represented by the thin continuous line 8 shown in FIGS. 3 and 4.

The cast masses 6 are cooled if necessary, for example by the blowing of cold air or by passing the plate 1 through a cooling channel, so as to accelerate hardening and, if necessary, definitive shaping of each packaged mass.

At this point, various methods for completing protection of the finished packaged articles can be used.

According to a first variation, the bare horizontal upper surface 7 of the mass 6 is covered with an as uniform as possible sprinkling of grains of a powdery material 9. These grains will consist of a material which is different from or, preferably, identical to that provided as a screen 8 in each cavity, so that the formulation of each composition can be more easily established.

According to a second variation, the surface 7 is coated with a fatty liquid material, such as that which is marketed under the trade name "Teepol", or else is covered with a film 10 of flexible material, paper or thermoplastic material, for example silicone-coated material.

The additional protective film 10 can, if required, cover each cavity 2 individually (FIG. 4) or cover the plate 1 in a single sheet and thus protect all of the packaged masses inside the cavities of the said plate (FIG. 5).

Obviously, the invention is not limited to the methods of application nor to the embodiments which have been mentioned and different variations are possible without, however, departing from the scope of the present invention. This is the case, in particular, with regard to protection of the bare horizontal upper surface of each packaged mass, which can be performed mechanically by means of a lid in the form of a cloche.

This is also the case for various powdery materials used for the preparation of the protective screen 4 and, if necessary, for the preparation of the upper screen 9, it being possible for the said materials to possess advantageously the following properties:

they are suitable in the natural state, or after treatment, for the electrical charge required for electrostatic spraying,
they preferably can be melted,
they are compatible with the packaged adhesive composition, and,
they do not modify the intrinsic properties of this composition as regards its typical features, such as its viscosity and solidification point.

Numerous powdery materials which are inorganic, organic, organometallic or vegetable are suitable in this respect, including:

calcium carbonate and bentonite which, when incorporated in a formulation, decrease the price of the composition,
barium sulfate, which makes the adhesive mass radio-detectable,
titanium oxide and zinc oxide, which represent the most important fillers in the composition,
antinomy oxide, for making the composition flame-resistant,
talc, which is used to control the tack of the formulation, and chalk,
colloidal silicas and others,
hard waxes, polyethylene waxes, modified polyethylene waxes,
a polymer in powder form (polyethylene, polypropylene, EVA),
a hot-melt or a resin in powder form,
an anti-oxidant or anti-UV agent, for example, a phenol derivative,
a natural gum (gum arabic),
starch, bone meal, guar flour.

I claim:

1. A method for packaging a permanent adhesive composition in a plate provided with one or more cavities, said method comprising the steps of:
   providing a plate with one or more cavities having an open top;
   providing by electrostatic coating, a screen, of powdery material over the entire surface of each cavity;
   casting the composition in each cavity of the plate to form a mass, the electrostatic coating being such as to maintain the coherence of the screen during casting;
   cooling the cast mass to cause at least that part of the screen adjacent to the mass to become part of the mass;
   the mass having an exposed face corresponding to the open top of the cavity; and
   protecting the exposed face.

2. The method of claim 1, wherein said protecting prevents impurities from becoming attached to the exposed face.

3. The method of claim 1, wherein in said screen providing step, the screen is obtained by superimposing several layers of grains of a powdery material.

4. The method of claim 2, wherein in said screen providing step, the screen is obtained by superimposing several layers of grains of a powdery material.

5. The method of claim 2, wherein said protecting step comprises applying a film of flexible material to the exposed face of the mass.

6. The method of claim 4, wherein said protecting step comprises applying a film of flexible material to the exposed face of the mass.

7. The method of claim 2, wherein said protecting step comprises applying a film of paper to the exposed face of the mass.

8. The method of claim 4, wherein said protecting step comprises applying a film of paper to the exposed face of the mass.

9. The method of claim 2, wherein said protecting step comprises applying a film of thermoplastic material to the exposed face of the mass.

10. The method of claim 4, wherein said protecting step comprises applying a film of thermoplastic material to the exposed face of the mass.

11. The method of claim 1, wherein in said screen-providing step, the powdery material comprises the full amount of at least one of the constituents of the formulation for which the permanent adhesive composition is intended, whereby the formulation is complete.

12. The method of claim 3, wherein in said screen-providing step, the powdery material comprises the full amount of at least one of the constituents of the formulation for which the permanent adhesive composition is intended, whereby the formulation is complete.

13. The method of claim 6, wherein in said screen-providing step, the powdery material comprises the full amount of at least one of the constituents of the formulation for which the permanent adhesive composition is intended, whereby the formulation is complete.

14. The method of claim 8, wherein in said screen-providing step, the powdery material comprises the full amount of at least one of the constituents of the formulation for which the permanent adhesive composition is intended, whereby the formulation is complete.

15. The method of claim 10, wherein in said screen-providing step, the powdery material comprises the full amount of at least one of the constituents of the formulation for which the permanent adhesive composition is intended, whereby the formulation is complete.

16. The method of claim 1, wherein in said screen-providing step, the powdery material comprises an insufficient but perfectly defined part of at least one of the constituents of the formulation for which the permanent adhesive composition is intended, whereby the quantity of powdery material can be brought up to the ideal percentage when all the other constituents of the formulation are subsequently added.

17. The method of claim 3, wherein in said screen-providing step, the powdery material comprises an insufficient but perfectly defined part of at least one of the constituents of the formulation for which the permanent adhesive composition is intended, whereby the quantity of powdery material can be brought up to the ideal percentage when all the other constituents of the formulation are subsequently added.

18. The method of claim 6, wherein in said screen-providing step, the powdery material comprises an insufficient but perfectly defined part at least one of the constituents of the formulation for which the permanent adhesive composition is intended, whereby the quantity of powdery material can be brought up to the ideal percentage when all the other constituents of the formulation are subsequently added.

19. The method of claim 8, wherein in said screen-providing step, the powdery material comprises an insufficient but perfectly defined part of at least one of the constituents of the formulation for which the permanent adhesive composition is intended, whereby the quantity of powdery material can be brought up to the ideal percentage when all the other constituents of the formulation are subsequently added.

20. The method of claim 10, wherein in said screen-providing step, the powdery material comprises an insufficient but perfectly defined part of at least one of the constituents of the formulation for which the permanent adhesive composition is intended, whereby the quantity of powdery material can be brought up to the ideal percentage when all the other constituents of the formulation are subsequently added.

* * * * *